UNITED STATES PATENT OFFICE.

EMILE HEMMING, OF PASSAIC, NEW JERSEY, ASSIGNOR TO HEMMING MANUFACTURING COMPANY, OF GARFIELD, NEW JERSEY, A CORPORATION OF NEW JERSEY.

PROCESS OF MAKING INSULATING MATERIALS.

1,039,940. Specification of Letters Patent. Patented Oct. 1, 1912.

No Drawing. Application filed April 12, 1911. Serial No. 620,549.

*To all whom it may concern:*

Be it known that I, EMILE HEMMING, a citizen of Switzerland, residing at Passaic, in the county of Passaic and State of New Jersey, have invented certain new and useful Improvements in Processes of Making Insulating Materials, of which the following is a specification.

This invention relates to the process of making compressed fireproof materials for electrical insulating and other purposes, composed of asbestos and a cementitious binder such as Portland cement which hardens by hydration and setting. The resulting articles, when thoroughly dried, may be rendered substantially waterproof by impregnation with a bituminous or resinous substance such as coal tar pitch, and a solvent, followed by drying or baking to drive off the volatile matter, but this waterproofing treatment is not an essential part of my invention and in some instances is omitted.

My invention relates especially to the nature and order of the operations employed in hydrating the material, and its object is mainly to attain a thorough hardening without any tendency of the articles to swell or warp after being compressed or molded. The total hydration is divided into stages, and owing to the absorbent quality of the asbestos, the latter reacts physically with the water and the cement during the initial hydration, and again during the subsequent hydration, in a beneficial manner which I believe to be novel.

In carrying out my process I may take, by way of example, 1 part by weight of asbestos, preferably in the ground or powdered form, and 3 parts of a binder such as Portland cement, to which, if the mold is of complicated form, a small quantity of a solution of silicate of soda (water glass) may be added to give sharp definition; mix these thoroughly together, add enough water to make a thick paste; and then subject the paste to heavy pressure in a suitable mold.

The water may be added before the mixture is placed in the mold or while it is in the mold, but its quantity should be insufficient to produce any great degree of fluidity in the paste. It may for example be present in the proportion of about 10 to 12 per cent. of the total weight of the moistened mixture. If only about 10 per cent. of water is used for the initial hydration, it will practically all remain in the molded article after the latter has been compressed. If more water is used, some of it will generally be expressed by the molding pressure. The quantity remaining or contained in the article however, while sufficient to produce considerable hardness when the molded article is dried, is insufficient to fully utilize the setting properties of the cement. Therefore after the article is removed from the mold I allow it to dry and set sufficiently to insure the retention of its form and prevent subsequent swelling or warping, and I then soak the article in or sprinkle it with water for a further period of time until it is thoroughly set or hardened, after which it is allowed to dry. The material in this condition may be used for various purposes without further treatment, but where waterproof qualities are desired, the articles may further be impregnated, preferably in a vacuum, with a suitable resinous or bituminous substance such as coal tar pitch and a solvent, the impregnated article being then baked in an oven to drive off the volatile constituents of the impregnating substance.

I am aware that the steps of initial hydration of a mixture of sand or the like and hydraulic cement, followed by molding, drying, further hydration and further drying are not new. But sand and similar materials are non-absorbent. The asbestos which I employ, being highly absorbent, acts like a sponge to retain a portion of the water during the initial hydration, and yields it slowly to the cement in the molded article as fast as the cement can take it up, thereby enabling the water to be used at first in greater effective quantity and producing greater hardness and strength to resist the cracking and distorting tendency of the subsequent hydration. When the final wetting is administered, the now dried asbestos fibers act as a multiform capillary conduit permeating the entire substance of the molded article, and consequently the final hydration and setting are more quickly, uniformly and thoroughly effected than where a non-absorbent filler is employed. There is also the added strength due to the interlocking qualities of the asbestos, which my product exhibits in common with other products of asbestos and hardened cement, which have not, however, so far as I am aware, been heretofore produced by a process equivalent to that described above.

I claim:

The herein described process which consists in mixing hydraulic cement, asbestos and water, compressing the same, allowing the article to dry and then subjecting the same to a subsequent hydration, the asbestos employed being in relatively large and sufficient quantity to serve as an absorbent in both hydrations, the moisture being absorbed by the asbestos and cement and yielded up from the asbestos to the cement as the latter hardens whereby the moisture is distributed uniformly throughout the article by said asbestos and produces a complete hydration and set of the cement.

In testimony whereof I have hereunto set my hand in the presence of two subscribing witnesses, this eleventh day of April, 1911.

EMILE HEMMING.

Witnesses:
R. M. PIERSON,
G. BLAKE.